(12) United States Patent
Hick

(10) Patent No.: US 9,931,911 B2
(45) Date of Patent: Apr. 3, 2018

(54) SLIDING WINDOW

(71) Applicant: AGC GLASS EUROPE, Louvain-la-Neuve (BE)

(72) Inventor: Robert Hick, Chenee (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 0 days.

(21) Appl. No.: 14/894,451

(22) PCT Filed: May 15, 2014

(86) PCT No.: PCT/EP2014/059958
§ 371 (c)(1),
(2) Date: Nov. 27, 2015

(87) PCT Pub. No.: WO2014/191215
PCT Pub. Date: Dec. 4, 2014

(65) Prior Publication Data
US 2016/0114655 A1  Apr. 28, 2016

(30) Foreign Application Priority Data

May 28, 2013  (BE) .................................... 2013/0372

(51) Int. Cl.
*B60J 1/16* (2006.01)
*E05D 15/10* (2006.01)
(Continued)

(52) U.S. Cl.
CPC ................ *B60J 1/16* (2013.01); *E05B 59/00* (2013.01); *E05B 63/22* (2013.01);
(Continued)

(58) Field of Classification Search
CPC ........ B60J 1/16; E05D 15/06; E05D 15/0621; E05D 15/1047; E06B 3/4654;
(Continued)

(56) References Cited

U.S. PATENT DOCUMENTS 7,509,773 B2 * 3/2009 Vornbaumen ......... E05F 11/423
                                                49/209
7,568,312 B2 * 8/2009 Dufour .................. B60J 1/1853
                                                49/216
(Continued)

FOREIGN PATENT DOCUMENTS

EP      0778168      11/1997
EP      0972663      1/2000
(Continued)

OTHER PUBLICATIONS

International Search Report dated Jun. 16, 2014 in PCT/EP14/059958 Filed May 15, 2014.
(Continued)

*Primary Examiner* — Jerry E Redman
(74) *Attorney, Agent, or Firm* — Oblon, McClelland, Maier & Neustadt, L.L.P.

(57) ABSTRACT

A device for opening and closing a movable window of a motor vehicle, the movable window being movable relative to a fixed panel, from a closed position in which the movable window is positioned flush with the fixed panel, to an open position in which the movable window is moved parallel to the fixed panel. The device includes an assembly controlled from a handle mechanism supported by an edge of a frame secured to the movable window, such that starting from the closed position, actuating the handle a first time releases locking of the movable window then, secondly, brings the movable window out of its closed position, an edge of the window corresponding to the edge of the frame being moved relative to the fixed panel, to the position allowing sliding of the movable window.

16 Claims, 6 Drawing Sheets

(51) Int. Cl.
*E05B 59/00* (2006.01)
*E05B 63/22* (2006.01)
*E05B 65/08* (2006.01)
*E05C 1/14* (2006.01)
*E05C 9/08* (2006.01)
*E05C 17/62* (2006.01)
*E05C 3/14* (2006.01)
*E05D 15/06* (2006.01)
*E06B 3/46* (2006.01)
*E05B 17/20* (2006.01)
*E05B 65/00* (2006.01)

(52) U.S. Cl.
CPC ............ *E05B 65/0835* (2013.01); *E05C 1/14* (2013.01); *E05C 3/14* (2013.01); *E05C 9/08* (2013.01); *E05C 17/62* (2013.01); *E05D 15/06* (2013.01); *E05D 15/0621* (2013.01); *E05D 15/1047* (2013.01); *E06B 3/4618* (2013.01); *E06B 3/4654* (2013.01); *E05B 17/2034* (2013.01); *E05B 65/0014* (2013.01); *E05D 2015/1028* (2013.01); *E05D 2015/1055* (2013.01); *E05Y 2201/22* (2013.01); *E05Y 2201/62* (2013.01); *E05Y 2201/68* (2013.01); *E05Y 2201/686* (2013.01); *E05Y 2201/71* (2013.01); *E05Y 2900/55* (2013.01)

(58) Field of Classification Search
CPC . E06B 3/4618; E05C 3/14; E05C 9/08; E05C 1/14; E05B 63/22; E05B 59/00
USPC .................... 49/413, 213, 128, 130
See application file for complete search history.

(56) References Cited

U.S. PATENT DOCUMENTS

| | | | |
|---|---|---|---|
| 2006/0174544 A1* | 8/2006 | Dufour | E05F 11/535 49/413 |
| 2006/0260205 A1 | 11/2006 | Dufour et al. | |
| 2012/0068478 A1* | 3/2012 | Nania | B60J 1/16 292/165 |
| 2012/0167469 A1* | 7/2012 | Maltaverne | B60J 1/16 49/360 |
| 2015/0052819 A1* | 2/2015 | Lee | E06B 3/4627 49/420 |
| 2015/0089875 A1* | 4/2015 | Malmrose | E06B 3/4627 49/130 |
| 2016/0114655 A1* | 4/2016 | Hick | E06B 3/4654 49/127 |

FOREIGN PATENT DOCUMENTS

| | | |
|---|---|---|
| EP | 1659247 | 5/2006 |
| EP | 1 719 651 A1 | 11/2006 |
| EP | 1939384 | 2/2008 |
| EP | 1 920 957 A1 | 5/2008 |
| EP | 2019180 | 1/2009 |

OTHER PUBLICATIONS

Third Party Observation for Application No. EP2014-0724729 dated May 17, 2017 (with English Machine Translation).

* cited by examiner

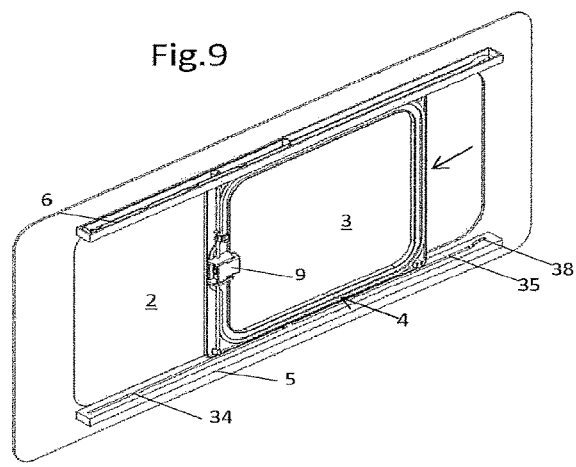
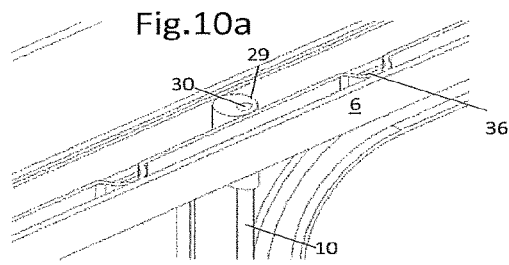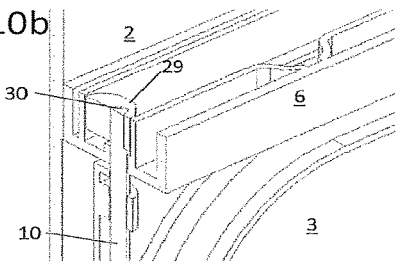
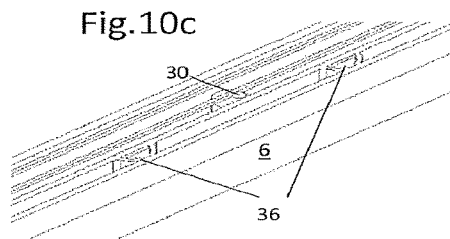

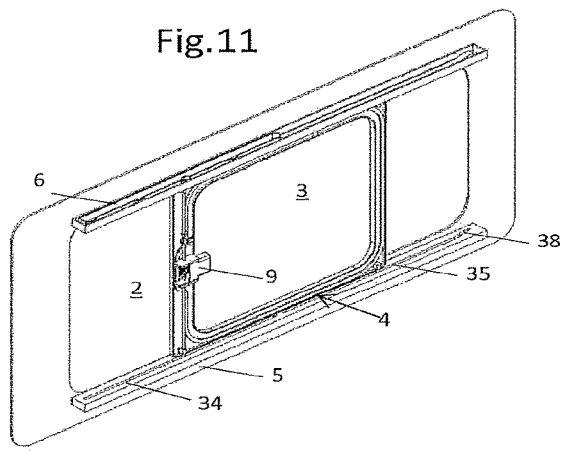
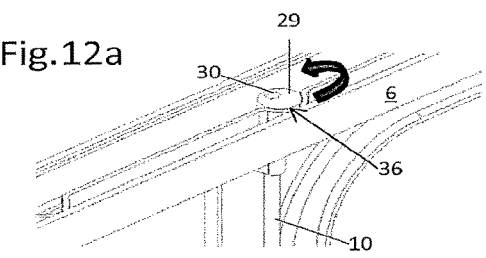
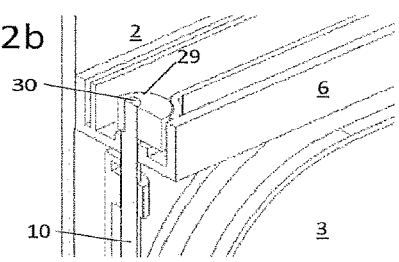
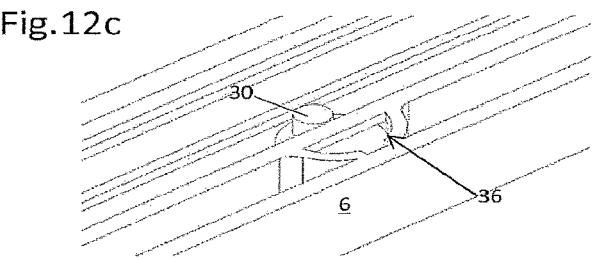

SLIDING WINDOW

The invention relates to automotive windows which open by means of a sliding movement. More precisely, the invention relates to those windows which, when closed, are placed in an opening in a fixed assembly, which opening can be created in a fixed panel, which panel most often itself consists of a window.

Windows of this type are proposed in the prior art, presenting various configurations. The most desirable present well-defined characteristics. Among these, it is preferred for the movable window to be inserted into the fixed panel such that, outwardly, it is in the same plane as the fixed panel, referred to as a "flush" configuration. This arrangement is preferred for esthetic and aerodynamic reasons. Another characteristic required by users is that the movement of the window, from its closed position to its open position and vice versa, be convenient to perform, the device allowing this sliding being as ergonomic as possible. It is also necessary that the proposed windows be openable only from inside the vehicle so as to avoid break-ins.

In practice, all of the windows in question comprise common elements. In particular, the movable windows are articulated on rails, attached to the panel, in which there are created the openings which they then close. Mechanical means connect the movable window to the rails and guide the movable window by translation from the closed position in the plane of the fixed panel to an open position in which the movable window is in a plane parallel to that of the fixed panel.

The mechanical means employed hitherto either do not entirely meet users' requirements or do so at the cost of increased complexity of the means or conditions of use which are more or less convenient.

Among the prior embodiments, one particular difficulty which has become apparent is that of designing a mechanism for actuating the movable window which not only performs the movement described above in a convenient manner but which also provides effective locking of the movable window in the closed position, all of which being effected in a single movement which is convenient for the passengers of the vehicle to perform. One object of the invention is thus to propose a device whose operation and makeup are simplified, while meeting the requirements disclosed above.

The subject of the invention is as stated in claim 1.

One property of the invention is to reduce all of the movements, required for using the movable window, to the actuation of the handle borne by the frame of the movable window. According to the invention, the mechanism itself of the handle connected to this window operates in multiple stages corresponding to an action comprising the use of successive mechanisms which are all included in the handle. This mechanism separates the immobilization/release of the movable window from its movement out of the opening in the fixed panel and from its prior sliding.

More precisely, the mechanism of the handle, when actuated, first acts to release a set of means which allow the movable window to be disengaged from its closed position. The same handle then drives the disengagement in question when it continues to be actuated.

The movement of the movable window from its closed position to its open position is effected by means of a guiding assembly comprising on one hand articulations in the form of eccentrics which are able to move in rotation, are secured to the movable window and are engaged in tracks created in rails attached to the fixed panel. The rails are located on either side of the movable window, respectively one at the upper portion and the other at the lower portion. Such a device is presented in particular in published document EP 1 945 473. This document further describes means by which it is possible to lock the window in the closed position, but these means are independent of those allowing the window to slide. The movement of the handle must be complemented with an additional compulsory movement from the latter in order for the window to move. The process of moving the window is thus more complex than is proposed according to the invention.

Patent EP 1 719 651 presents a solution similar to that of the preceding document as regards the movements of the movable window. The assembly, at the cost of a certain degree of complexity, is such that it allows the movable window to move such that it is always held in a plane parallel to that of the fixed panel.

The devices according to the invention differ from the earlier devices in that they propose a single control for the window, which control immobilizes/releases the movable window in its closed position but also causes the window to slide. The invention adds, to this operation, the possibility of holding the movable window in a partially open position, either by completely immobilizing it in positions provided previously or in any position but this position being provided only in a relative manner relying on friction between certain elements of the device.

One advantageous implementation of the invention involves connecting the mechanism of the control handle to an assembly which transmits the motion converts the motion of the latter and causes the movable window to move both to disengage from its closed position and in translation. Preferably, the transmission is obtained by means of a rod arranged along the edge of the window, which rod comprises, at its ends, elements designed to engage with rails secured to the fixed panel in order to guide the movement of the window, wherein, moreover, the rotational movement of the rod is controlled by the mechanism of the handle. In this embodiment according to the invention, the handle is also the means by which the rod can be immobilized/released in rotation, and consequently the means which locks the movable window in the closed position.

In order to cause the rod to rotate, the handle advantageously moves in translation, which is converted into a rotational movement of the rod by means of a rack moved by the handle and a pinion borne by the rod, wherein the rack meshes with the pinion. Independently of the indicated rotational movement, the rod is immobilized by the mechanism of the handle when the handle is not actuated and when the window is in the closed position. The rod is allowed to rotate only once the used handle has passed a threshold of use. This construction ensures closure of the movable window avoiding any possibility of a break-in, as release is only possible using the handle arranged inside the vehicle.

Advantageously, for simplicity, the rod is prevented from rotating in the closed position by an element borne by the movable part of the handle, which element engages with a part secured to the rod, the shape of which part is not axisymmetric about the axis of the rod. The corresponding means may be of various shapes, some of which are detailed in relation to exemplary embodiments described later.

According to the invention, actuation of the handle advantageously corresponds to translation in a plane essentially parallel to the window. It is thus possible to avoid the handle moving inward into the passenger compartment. In particular, the movement allows the user to press simultaneously on the handle and on the frame of the movable window, ensuring in a single gripping motion. In order to make the movement of the handle as convenient and ergonomic as possible, this movement is, for any maneuver, a translation in a single direction corresponding to the contraction of the hand of the user. Once the handle has been released, it is returned to the "rest" position by return means, advantageously springs which act to push the handle back to its initial position. Other return means act on the rotation of the rod.

Still with regard to implementing an assembly comprising the rotating rod, the ends of the latter, which engage with the sliding rails, comprise elements which can move both in rotation and in translation in the sliding rails. These means are advantageously off-center with respect to the axis of the rod, such that the rotation of the rod simultaneously causes the latter to move with respect to the rails and moves the movable window away from its closed position. The corresponding movement and the rotation must be limited to that resulting in this position which moves the window away from its closed position. In order to limit this movement, the rod is provided with a rotation-limiting element which engages for example with an element forming a stop secured to the frame in which is located the mechanism of the handle. Advantageously, this element is combined on the rod with that which immobilizes in rotation in the first stage of actuating the handle. For example, this is in the form of a sort of cam whose profile makes it possible to perform these two functions.

Beyond the movement corresponding to the disengagement of the movable window from its closed position, during translation, the rod is held in the rails in the position which holds the window out of the plane of the fixed panel. This opposes the reverse return rotation of the rod and, simultaneously, when the handle is released, brakes the motion of the window by virtue of friction between the rails and the means located at the ends of the rod.

Where relevant, the rails comprise recesses into which the ends can shift, by reverse rotation, with respect to the sliding tracks and immobilize the window in pre-established open positions.

The device according to the invention may also comprise means for preventing the window from opening which are independent of the closing means described previously. These are for example safety means to avoid handling by children present in the vehicle. These means are advantageously additional means which prevent the rod from rotating.

In the following, the invention is described in detail for particular embodiments, with reference to the appended figures, in which.

Figure 2:
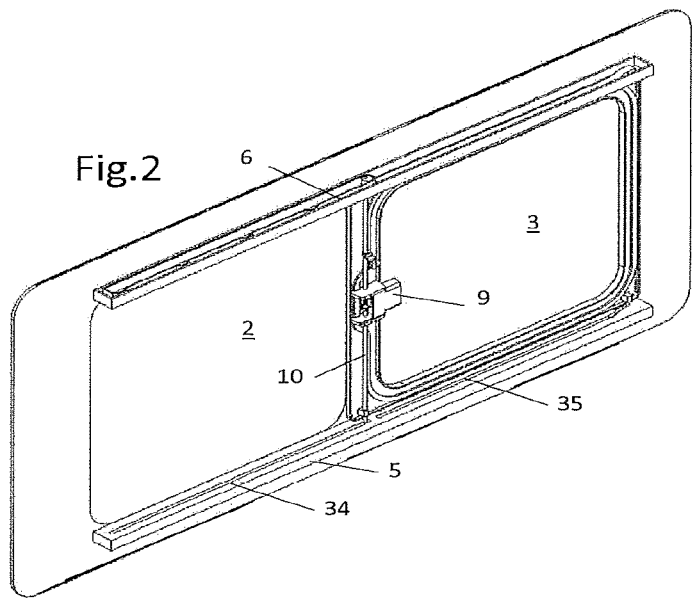
FIG. 2 is similar to FIG. 1, the cover concealing the actuation mechanism being removed.
Figure 3:
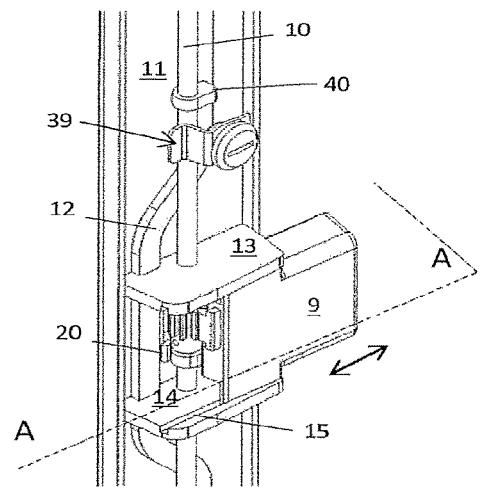
FIG. 3 shows an enlarged detail of the handle in FIG. 2.
Figure 4A:
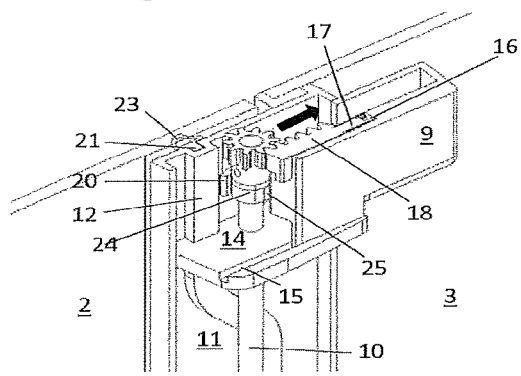
Figure 4B:
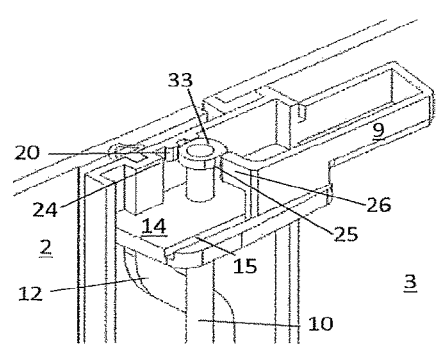
Figure 5A:
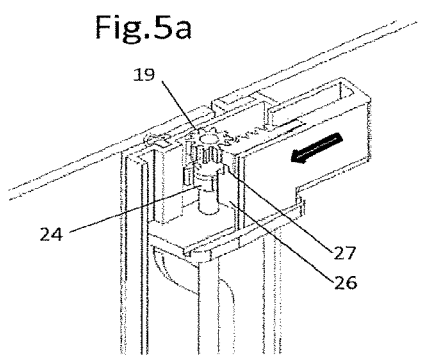
Figure 5B:
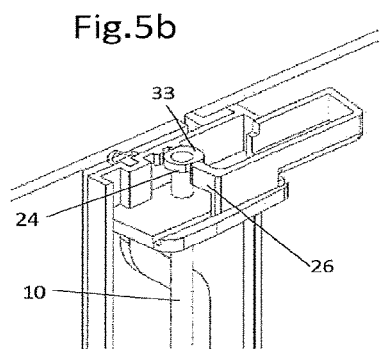
Figure 6A:
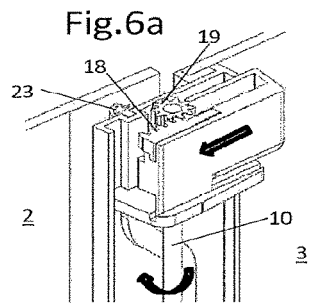
Figure 6B:
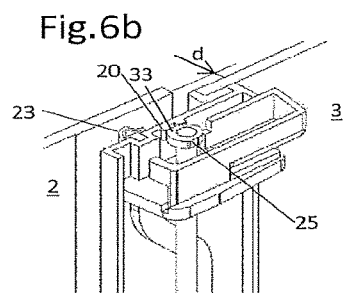
Figure 7A:
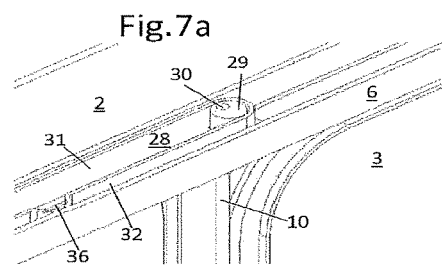
Figure 7B:
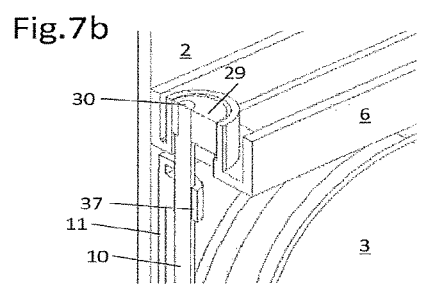
Figure 7C:
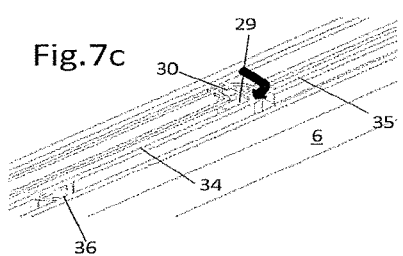
Figure 8C:
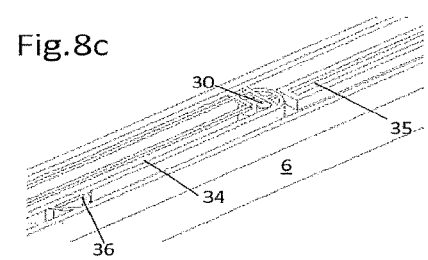
Figure 8A:
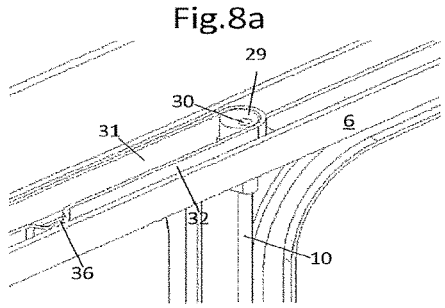
Figure 8B:
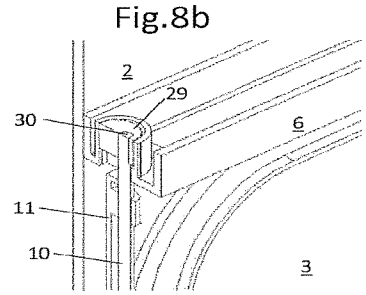

FIG. 4*a* shows, in horizontal section along A-A in FIG. 3, a detail view of the mechanism of the handle;

FIG. 4*b*, similar to the preceding figure, shows a horizontal section below the pinion of the mechanism of the handle, at the system for immobilizing the rod by means of the handle;

FIGS. 5*a* and 5*b* are similar to the preceding figures and show the mechanism of the handle in the position allowing the mechanism to rotate;

FIGS. 6*a* and 6*b* show the position of the mechanism with the handle fully actuated;

FIGS. 7*a*, 7*b* and 7*c* show the position of the means located in the support rails in the position locking the window, FIGS. 7*b* and 7*c* being in section;

FIGS. 8*a*, 8*b* and 8*c* are similar to FIG. 7 and show the positions after unlocking;

FIG. 9, similar to FIG. 2, shows the window in a position slid part way along;

FIGS. 10*a*, 10*b* and 10*c* are similar to FIGS. 7 and 8, for the window in the position presented in FIG. 9;

FIG. 11, similar to FIG. 2, shows the movable part 3 of the window moved into another position;

FIGS. 12*a*, 12*b* and 12*c* are similar to FIGS. 7, 8 and 10, for the window in the position presented in FIG. 11.

Figure 1:
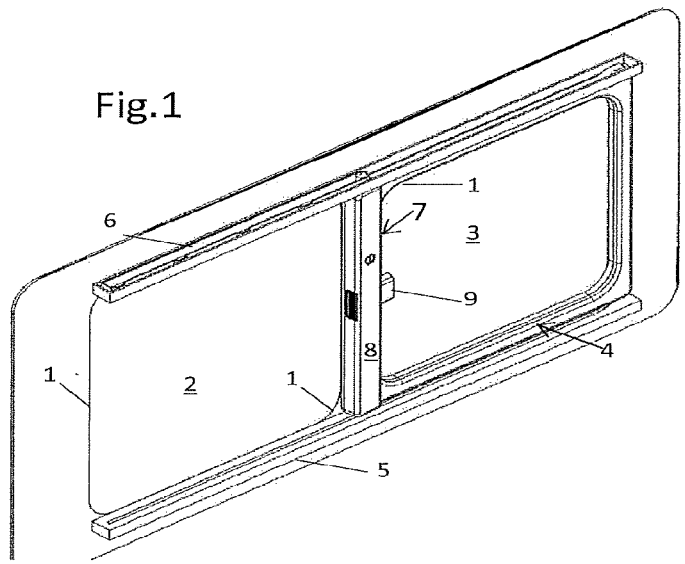
FIG. 1 is a perspective representation of a sliding window according to the invention.

FIG. 1 shows, schematically, the overall make up of the movable window according to the invention mounted on a fixed panel 2 consisting of a larger window. The window 2 is usually attached to the body of the vehicle by adhesive bonding. In order to hide the adhesive bonding zones, it is customary to coat the edges of the window with an opaque enameled strip, the limit of which is indicated by 1.

The fixed window 2 comprises an opening into which is inserted the movable window 3. The dimensions of the latter correspond to those of the opening, leaving the minimum necessary margin in order to permit the movements described later. The movable window, when in the closed position, is aligned in the plane of the fixed window 2, "flush" therewith.

The movable window 3 is in a frame 4 which surrounds it peripherally. In order to ensure the "flush" arrangement, the frame 4 is entirely on that side of the window 3 oriented toward the passenger compartment. The frame is advantageously adhesively bonded to this face of the window 3 and is hidden externally, also by means of the masking enamel.

Two rails 5 and 6 are also adhesively bonded to the fixed window 2. They are also advantageously adhesively bonded in the zones covered with masking enamel.

The frame 4 is mounted so as to be able to move on the rails 5, 6 which extend longitudinally. Since the movement of the movable window is preferably in horizontal translation, the rails are themselves arranged essentially horizontally.

In FIG. 1, the rail 6 is shown exposed in its upper portion, providing a view of the guiding means detailed later.

The frame 4 comprises, on its vertical edge 7, an opening and locking control assembly concealed beneath a cover 8. This assembly is actuated using a handle 9 arranged such that a single movement is sufficient to lock or unlock the frame 4 of the movable window 3 and to cause it to slide in the rails 5 and 6.

FIG. 2 shows the same window as FIG. 1, the cover 8 concealing the mechanism being removed shows a rod 10 on which is articulated the mechanism driven by the handle 9, the structure and operation of this mechanism being detailed in FIGS. 3 to 6. The rod 10 extends as far as the rails 5 and 6, and bears, at its two ends, guiding and locking elements which will be detailed in FIGS. 7, 8, 10 and 12.

FIG. 3 repeats part of FIG. 2, at the control mechanism. This mechanism is attached to the base of the frame 11, onto which is attached the movable window 3. The base of the frame 11 comprises a projecting portion 12 which extends over the entire height of the vertical edge 7. On the side oriented toward the portion of the fixed window 2, a groove 21 corresponds to this projecting portion 12 and receives a flexible seal 23 which rests against the window 2. The curvature of the projecting portion 12 at the level of the mechanism of the handle may facilitate installation of the various elements of the mechanism. This shape is not absolutely necessary and a straight shape is also advantageous.

Two plates 13 and 14, attached to the base 11 of the frame 4 and on the projecting portion 12, hold the rod 10 while allowing it to rotate.

The handle 9 is able to move in translation in a direction essentially parallel to the plane of the window. In the embodiment shown, the handle is guided in this translation by the walls constituting the body of this handle sliding in two grooves 15 created in the plates, of which the figure shows only that of the lower plate 14.

FIG. 4a shows the device of the handle in section along the plane A-A in FIG. 3, which plane is located below the plate 13. In this figure, the handle is in the rest position. The portion which extends outside the frame 4 is pushed back in the direction of the arrow by a spring 16 which surrounds the stem 17 that is integral with a rack 18.

The rack 18 meshes with a pinion 19 secured to the rod 10. The rod 10 also bears a ring 24 of complex shape. The ring comprises a vertical bevel which constitutes a flattened portion 25. The ring 24 forms an eccentric cam with respect to the axis of the rod 10. That portion 33 which is furthest from the axis, as shown in FIG. 4b, is such that it opposes the rotation of the rod beyond an angle of approximately 180°, being retained by the stop 20 arranged on the base 11.

FIG. 4b is a horizontal section as previously, located below the pinion 19. The position is that corresponding to the handle pushed back in the rest position. In this position, a turn-back 26 of the wall of the handle is opposite the flattened portion 25 of the ring 24 and in contact therewith with minimal play, such that the stem 10 is immobilized.

FIG. 5a and FIG. 5b show the start of the translational movement of the handle leading to compression of the return spring 16. This first stage ends when the stem 17 of the rack 18 abuts against the end of the slide 27 which houses the rack. In this first stage, the rack 18 remains immobile, immobilized by the turn-back 26 and the flattened portion 25 of the ring 24. Subsequent progression of the handle allows the rod 10 to rotate.

FIGS. 6a and 6b show the handle in its final position. The rod 10, which is allowed to rotate, is driven by the rack 18 and the pinion 19.

As indicated hereinabove, the rotation of the rod 10 drives that of the means engaging with the rails in order to lock and unlock as described later.

In the position of FIG. 6, the assembly of the movable window 3 and the upright 7 of the frame 4 comprising the mechanism is moved in a direction away from the plane of the fixed panel 2, by a distance d greater than the thickness of the fixed panel 2. The movable window 3 is ready to slide so as to be face-to-face with the portion 2.

The above-mentioned movement of the handle is opposed by return means (not shown). These return means act on the rod 10 to give rise to a rotation counter to that obtained by actuating the handle 9. As soon as pressure on the latter is released, the rod 10 tends toward this return rotation. The mechanisms discussed hereinbelow have the effect that this return to position may be incomplete due to the particular position of the means located at the ends of the rod in the sliding rails.

FIG. 7a shows the rail 6 with its upper portion exposed so as to better present the components and their respective positions, and the portion 7 of the frame 4 is limited to that constituting the base 11, which base is attached to the movable window.

At the end 30 of the rod 10, a roller 29 is secured to the rod so as to rotate therewith. In the form presented, this roller is generally cylindrical but may have a different shape provided that it carries out the same functions which are detailed hereinbelow.

The roller may slide in a track 28 bounded by walls 31, 32 created in the rail 6. In the embodiment presented, the walls are joined at their end by a wall in the form of an arc of a circle.

The end 30 of the rod 10 is off-center with respect to the axis of the roller such that the rotation of the rod 10 under the action of the handle 9, as described above, causes the whole of the portion 3 of the window to move with respect to the initial plane represented in this FIG. 7a. The movement d is that indicated above.

Visible in the lower rail 6 is the articulation of the end of the rod 10 in the rail. The rod 10 is guided in the track 34, shown in particular in FIG. 2. In the rotation, the rod 10, carrying with it the frame 4 and the movable window 3 attached by adhesive bonding to the frame, follows the track 34 created in the rail, which track is, at its origin, oriented so as to move this window away from the "flush" closed position.

FIG. 7b shows, in section in the axis of the roller 29 and perpendicular to the plane of the window, the position of the various elements. This figure shows a holding element 37 which attaches the rod 10 to the base 11 of the frame 4. This element 37 allows the rod to rotate freely. In the lower portion, a similar support completes the attachment of the rod.

In the same manner, FIG. 7c shows, in section at the level of the means for guiding the rod 10, the arrangements in the lower rail. The end of the rod is in a portion of the track 34 forming an elbow with its principal portion extending, as the rail, parallel to the plane of the fixed window 2.

The same representation is repeated in FIGS. 8a, 8b and 8c. These figures show the positions of the rod 10 after rotation under the action of the handle, as indicated above. The rotation of the rod is approximately one half-turn with respect to its initial position. The base 11 of the frame 4 has also moved away from the fixed panel 2 by an additional distance d.

FIGS. 9, 10a, 10b and 10c are similar to the preceding figures and show the situation when the sliding of the movable window 3 is under way.

FIG. 10a shows the position of the upper roller 29 in the track 28 of the rail 5, which track is entirely straight as shown in FIGS. 7a and 8a. The roller 29 remains in the position imposed during the preceding rotation of the rod 10. It is held in this position, in spite of the reverse rotation return means, by the end 30 of the rod 10. This is shown in FIG. 10c for the lower portion of the window, but the same arrangement can also be found in the upper position. In the lower portion, the end of the rod follows the track 34 parallel to that of the roller in the track 28.

If the actuation of the handle 9 is released, the end 30 of the stem is pressed against the walls of the track 34 under the effect of the return means. This pressure, and the resulting friction, act as a brake on any undesired movement of the window.

FIG. 11 and FIGS. 12a, 12b and 12c show the arrangement when the movable window is in an open position, and immobilized in this position.

FIG. 12a shows the roller 29 which, under the effect of the return means, has pivoted by one half-turn. This rotation is made possible by the presence of the recess 36. It takes place even though the end 30 of the stem 10 is held in its own track, as shown in FIG. 12c. Immobilization in this position is brought about by virtue of the fact that intervention at the handle is necessary in order to allow an additional movement of the movable window. Without this intervention, the rod is immobilized in rotation by means of the mechanism of the handle, while moving the roller 29 out of the recess 36 requires a rotation of the rod.

The figures show recesses 36 which are spaced apart from one another, thus limiting the number of these on the rail. The operation of these elements shows that they can be very close together if it is desirable to have a large number of intermediate immobilizing positions.

In the above, only those elements of the device operating with the handle have been described. They are all located on the same edge of the window, on that side of the latter which is arranged toward the front in the disengaging movement from the closed position. The movable window is necessarily held on the opposite side. The mechanism may be substantially simpler on that side. It may be sufficient to arrange tracks 35 in the rails 5 and 6. These tracks engage with elements borne by the frame 4. These may be simple pegs in so far as they do not bring about any movement not imposed by the track 35. The tracks 35 are essentially straight and aligned with the tracks 34 such that the movable window, once withdrawn from its closed position, moves while remaining essentially parallel to the fixed window 2.

In order to disengage the movable window on that side, as shown in FIGS. 9 and 11, the end 38 of the track 35 is at a certain angle with respect to the general direction of this track. This shape is designed to make this edge of the window pivot so as to guide the movable window 3 into the position disengaged from the opening in a plane parallel to that of the fixed panel 2. The pivoting is sufficiently inclined so as not to excessively brake the movement of the movable window.

The benefit of the assembly presented hereinabove, which renders the movement of the edge passive since it comprises no handle mechanism, is its great simplicity. It is of course possible to duplicate the systems presented for the other edge of the movable window, with the movements transmitted by rods linking the ends of the two edges of the window. If the choice of cost-effective mechanisms is of primary importance, it is preferable to choose the embodiment presented hereinabove.

Complementary elements may also be envisaged. In particular, as shown in FIG. 3, it is possible to have a "child safety" device. This is a means by which it is possible to prevent the handle being actuated by means of an additional, independent immobilization. In the embodiment presented in this FIG. 3, it is simply an element 39 which is attached to the base 11 of the frame and which, when turned, immobilizes a spur 40 secured to the rod 10. In order for the system to be not too easy to manipulate, in the embodiment presented, its rotation requires the introduction, into its slot, of for example the edge of a coin.

The invention claimed is:

1. A device for opening and closing a movable window of a motor vehicle, the movable window configured to move with respect to a fixed panel, from a closed position, wherein the movable window is arranged flush with respect to the fixed panel, to an open position, wherein the movable window is moved parallel to the fixed panel, the device comprising:
   an assembly, controlled from a handle mechanism attached to an edge of a frame secured to the movable window such that, starting from the closed position, actuation of the handle, in a first stage, unlocks the movable window once the handle reaches a threshold position and then, in a separate second stage after the first stage, further actuation of the handle leads the movable window out of the closed position, an edge of the window corresponding to the edge of the frame, being moved with respect to the fixed panel, toward a position allowing the movable window to slide.

2. The device as claimed in claim 1, wherein the movable window, in a closed position, is immobilized by the handle mechanism.

3. The device as claimed in claim 2, wherein the immobilization of the movable window is effected by rotation of a rod extending along the edge of the frame, the rod comprising, at ends thereof, means engaging with rails, attached to the fixed panel during sliding of the movable window.

4. The device as claimed in claim 3, wherein the handle comprises a means engaging with a ring forming a cam, arranged on the rod, preventing rotation of the rod, until a threshold in actuation of the handle is reached.

5. The device as claimed in claim 4, wherein the handle is configured to move in translation in a direction essentially parallel to the plane of sliding of the movable window.

6. The device as claimed in claim 5, wherein the handle comprises a rack which meshes with a pinion secured to the rod.

7. The device as claimed in claim 6, wherein the rack is made to move only once the threshold allowing rotation of the rod is exceeded.

8. The device as claimed in claim 4, wherein rotation of the ring under action of the handle is limited by one or more stops secured to the frame.

9. The device as claimed in claim 8, wherein rotation of the rod is limited to position ends of the rod in line with a straight portion of sliding tracks created in the rails.

10. The device as claimed in claim 3, further comprising return means which are secured to the rod and urge the rod to rotate in an opposite direction from that obtained by actuating the handle.

11. The device as claimed in claim 10, wherein the return means includes one or more coil springs which surround the rod and are coaxial therewith.

12. The device as claimed in claim 10, wherein reverse rotational movement, imposed by the return means when the handle is no longer actuated, presses the end of the rod against walls of a sliding track in the rails, braking by friction sliding movement when the window has been removed from a flush closed position of the movable window.

13. The device as claimed in claim 3, wherein, in addition to the end of the rod sliding in the track, the means engaging with the rails during sliding comprises rollers arranged eccentrically with respect to the end of the rod, the rollers remaining in straight tracks arranged in the rails during movements of the window.

14. The device as claimed in claim 13, wherein the sliding tracks of the rollers comprise one or more recesses in walls of the track, the recesses receiving the roller under effect of return rotation when the handle ceases to be actuated.

15. A device for opening and closing a movable window, the movable window configured to move with respect to a fixed panel from a closed position, wherein the movable window is arranged flush with respect to the fixed panel, to an open position, wherein the movable window is movable parallel to the fixed panel, the device comprising:
   a handle mechanism attached to an edge of a window frame;

an assembly attached to an edge of a frame secured to the movable window, the assembly controlled from a handle mechanism; and a rod extending along the edge of the frame, the rod having ends for engaging with rails secured to the fixed panel, and the rod having a ring forming a cam, wherein starting from the closed position, actuation of the handle, in a first stage, unlocks the movable window and, in a second stage after the first stage, further actuation of the handle leads the movable window out of the closed position, an edge of the window corresponding to the edge of the frame, being moved with respect to the fixed panel, toward a position allowing the movable window to slide, wherein the handle comprises a means engaging with the ring forming the cam thereby preventing rotation of the rod during the first stage of handle actuation until after a threshold in actuation of the handle is reached.

16. The device as claimed in claim 15, wherein the rod further comprises a pinion, the handle further comprises a rack, and the rack and pinion can only move with respect to each other during the second stage.

\* \* \* \* \*